United States Patent [19]
Merriman

[11] 3,894,326
[45] July 15, 1975

[54] CLAMP FOR LONGITUDINALLY ALIGNING PIPE SECTIONS

[76] Inventor: Augustus Lyons Merriman, Vinton, La. 70668

[22] Filed: Sept. 25, 1973

[21] Appl. No.: 400,496

[52] U.S. Cl. ................................. 29/200 P; 228/49
[51] Int. Cl. ...................... B23p 19/00; B23k 37/04
[58] Field of Search .......... 29/200 P, 200 Y, 200 R, 29/200 B; 228/49 WC

[56] References Cited
UNITED STATES PATENTS
| | | | |
|---|---|---|---|
| 2,846,968 | 8/1958 | Tipton | 228/49 WC |
| 3,422,519 | 1/1969 | Fehlman | 29/200 P |

*Primary Examiner*—Thomas H. Eager

[57] ABSTRACT

The clamp includes a pair of generally semicylindrical clamp sections each comprised of an open framework including a plurality of longitudinally extending circumferentially spaced guide bars and a plurality of longitudinally spaced, circumferentially extending stiffeners interconnecting the guide bars. The sections are preferably hinged one to the other along one side thereof and suitable bolts, clamps, etc. are provided for securing the opposite sides of the clamp sections one to the other. At least one end of the clamp is provided with a plurality of circumferentially spaced elements for guiding a pipe section end into the cylindrical clamp. The inner edges of the guide bars are recessed at like axial positions at a location corresponding to the location of the joint between the pipe sections to provide access to the pipe joint for welding the same. In use, the clamp is disposed about the end of one pipe section with the recessed portions of the guide bars in lateral alignment with the end of the pipe. The other pipe section is then received in the opposite end of the clamp whereby the pipe sections are longitudinally aligned for welding.

15 Claims, 5 Drawing Figures

CLAMP FOR LONGITUDINALLY ALIGNING PIPE SECTIONS

The present invention relates to a clamp for aligning butted pipe sections and particularly relates to a clamp adapted to hold pipe sections in axial alignment with clear access to the joint formed by the butted pipe sections for joining the same, for example, by welding.

A number of different pipe aligning clamps to facilitate welding of the pipe ends one to the other have been proposed and constructed in the past. Various difficulties, however, have been attendant to the practical and economic application of such clamps to pipe sections. One such difficulty is that a great number of such devices are heavy and cumbersome and not particularly adapted for use in the field. For example, joining riser casings one to the other in offshore drilling is oftentimes performed when the risers are vertically disposed. It will be appreciated that the heavy cumbersome nature of certain prior pipeline clamps do not readily admit of their use in welding pipeline risers. The same is also true of pipelines. Moreover, any such clamp must not only provide for accurate longitudinal alignment of the pipe but must also be rugged, dependable, and permit the joint to be welded without interference therewith from the clamp.

The present invention provides a clamp for aligning butted pipe sections one with the other which minimizes or eliminates the foregoing and other problems associated with prior pipeline clamps and provides a novel and improved clamp for aligning butted pipe sections having various advantages in construction, and mode of use in comparison with such prior pipe clamps. Particularly, the present invention provides a clamp comprised of a pair of generally semi-cylindrical clamp sections formed to provide an open framework about the pipe joint when the clamp is applied about the ends of the butted pipe sections. Thus, access to the juncture of the sections is afforded throughout its periphery whereby welding of the joint can be readily accomplished with only minor interference. Particularly, each clamp section is comprised of a plurality of circumferentially spaced longitudinally extending guide bars interconnected by axially spaced circumferentially extending stiffeners. The inner edges of the longitudinally extending guide bars serve to engage and clamp about the pipe sections when the clamp is applied thereto. The clamp sections are preferably hinged one to the other along one longitudinally extending side thereof whereby the sections may be pivoted toward or away from one another to respectively clamp about or be released from the butting ends of the pipe or riser sections. The guide bars on each of the clamp sections are provided with a plurality of openings which, when the clamp is applied about the pipe sections, lie in registry one with the other. Suitable bolts, clamps, etc. are provided to cooperate with the aligned openings to secure the clamp sections about the pipe section ends. At least one end of the clamp is provided with a plurality of circumferentially spaced guide elements. Each of these elements includes a tapered inner edge whereby a pipe section can be guided into one end of the clamp.

The clamp hereof is particularly adapted to facilitate welding of pipe sections one to the other when the latter are clamped. This is accomplished by providing the clamp with an open framework-type construction whereby access to the pipe sections, and particularly to the joint is provided. This is further facilitated by recessing the inner edges of the guide bars at like axial positions along the clamp. The stiffeners are also spaced axially from the recessed portions of the guide bars. Thus, the portions of the joint underlying the guide bars are exposed for welding. With the foregoing described construction the clamp is applied about a pipe section end with the end of the pipe lying in a diametrical plane containing the recesses. When the other pipe section is received in the opposite end of the clamp and the pipe section ends butted, it will be appreciated that the pipe joint is located in diametrical registry with the recessed portions of the guide bars. Thus, the pipe joint per se is fully exposed through the open framework of the clamp such that the pipe sections can be welded one to the other when clamped. From the foregoing described construction, it will be appreciated that the clamp hereof is rugged in construction, readily and easily fabricated and also particularly adaptable for use in welding riser sections one to the other in the offshore drilling environment.

Accordingly, it is a primary object of the present invention to provide a novel and improved clamp for longitudinally aligning butted pipe sections.

It is another object of the present invention to provide a novel and improved clamp for longitudinally aligning butted pipe sections and which clamp facilitates welding of the pipe ends one to the other.

It is still another object of the present invention to provide a novel and improved clamp for longitudinally aligning pipe sections and which clamp is rugged and dependable in use, economical to fabricate, and readily adaptable for use in joining pipeline riser sections in the offshore drilling environment.

It is a further object of the present invention to provide a novel and improved clamp for longitudinally aligning butted pipe sections wherein the clamp is comprised of an open framework particularly configured to provide access to the joint between the pipe sections whereby welding thereof is facilitated.

It is a still further object of the present invention to provide a novel and improved clamp for aligning butted pipe sections one with the other having the foregoing characteristics and wherein guide elements are provided at one end of the clamp for guiding one pipe section into alignment with another pipe section.

These and other objects and advantages of the present invention will become more apparent upon reference to the following specification, appended claims and drawings wherein:

Figure 1:
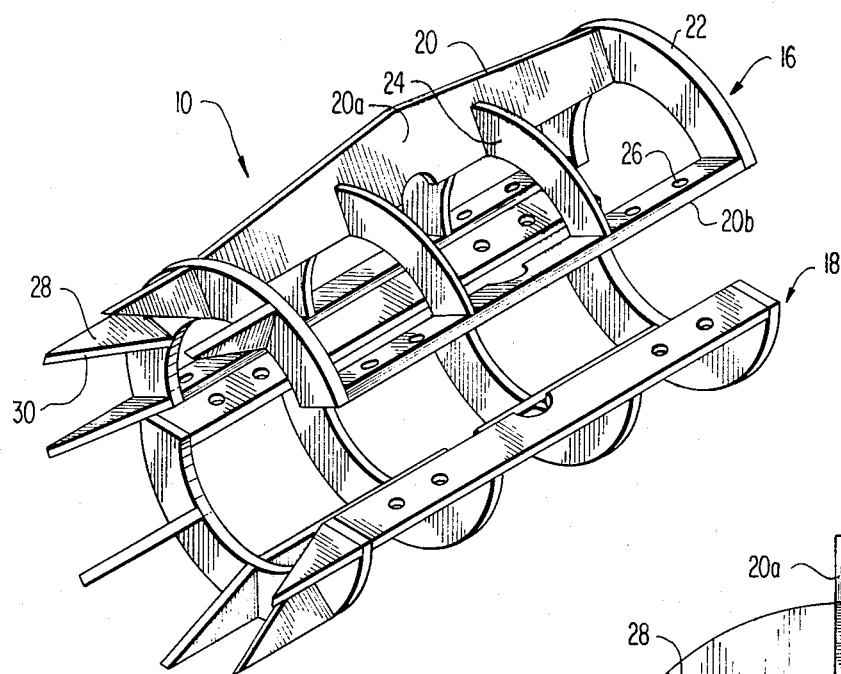
FIG. 1 is a perspective view of a pipe alignment clamp constructed in accordance with the present invention.
Figure 3:
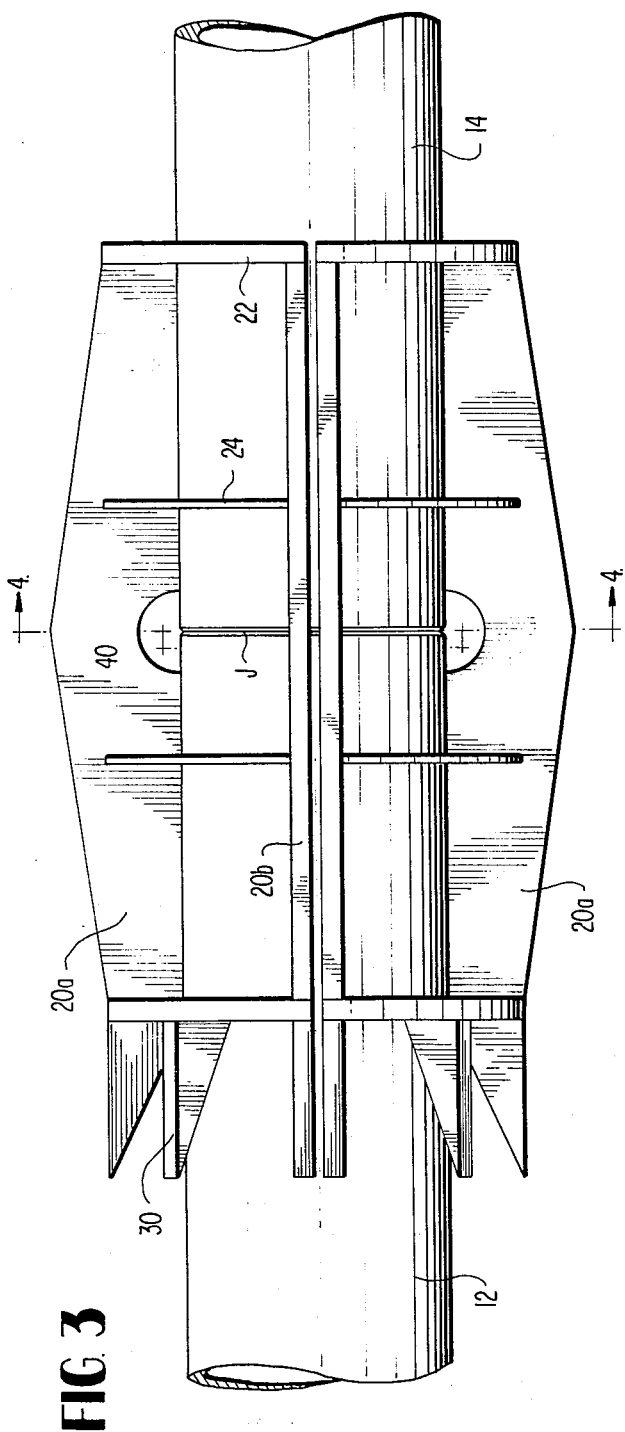
FIG. 3 is a side elevational view thereof illustrating the pipe clamp about a pair of butted pipe sections.

Referring now to the drawings and particularly to FIG. 1, there is illustrated a clamp generally designated 10 specifically adapted for clamping engagement about the butted ends of a pair of pipe sections, for example sections 12 and 14 illustrated in FIG. 3. Clamp 10 is comprised of a pair of generally semi-cylindrical clamp sections 16 and 18 each comprised of a plurality of longitudinally extending circumferentially spaced guide bars 20. In the illustrated clamp, the guide bars 20 of each section 16 and 18 are comprised of two types, guide bars 20a and 20b. Guide bars 20b comprise generally rectangular-shaped plates whereas each of the guide bars 20a in the respective pipe sections 16 and 18 has an enlarged mid section for added strength. The guide bars of each section 16 and 18 are interconnected one with the other by a plurality of axially spaced circumferentially extending stiffeners 22 and 24. The end stiffeners 22 may comprise semi-annular plates suitably secured as by welding to the ends of the bars 20a and 20b of the respective clamp sections 16 and 18. The intermediate stiffeners 24 may be comprised of arcuate plates extending substantially 90° with their opposite ends secured, for example, by welding to the guide bars 20a and 20b. Alternatively, the intermediate stiffeners 24 may comprise semi-annular plates notched at their intersection with the guide bar 20a of each clamp section, the guide bars 20a also being suitably notched to interlock stiffeners 24. The stiffeners and guide bars in this latter construction would also have welded connections therebetween. For reasons hereinafter specified, the guide bars 20b for each section 16 and 18 are provided with a plurality of openings 26 which register with the corresponding guide bars 20b of the opposing clamp section when the clamp sections are clamped together.

Figure 2:
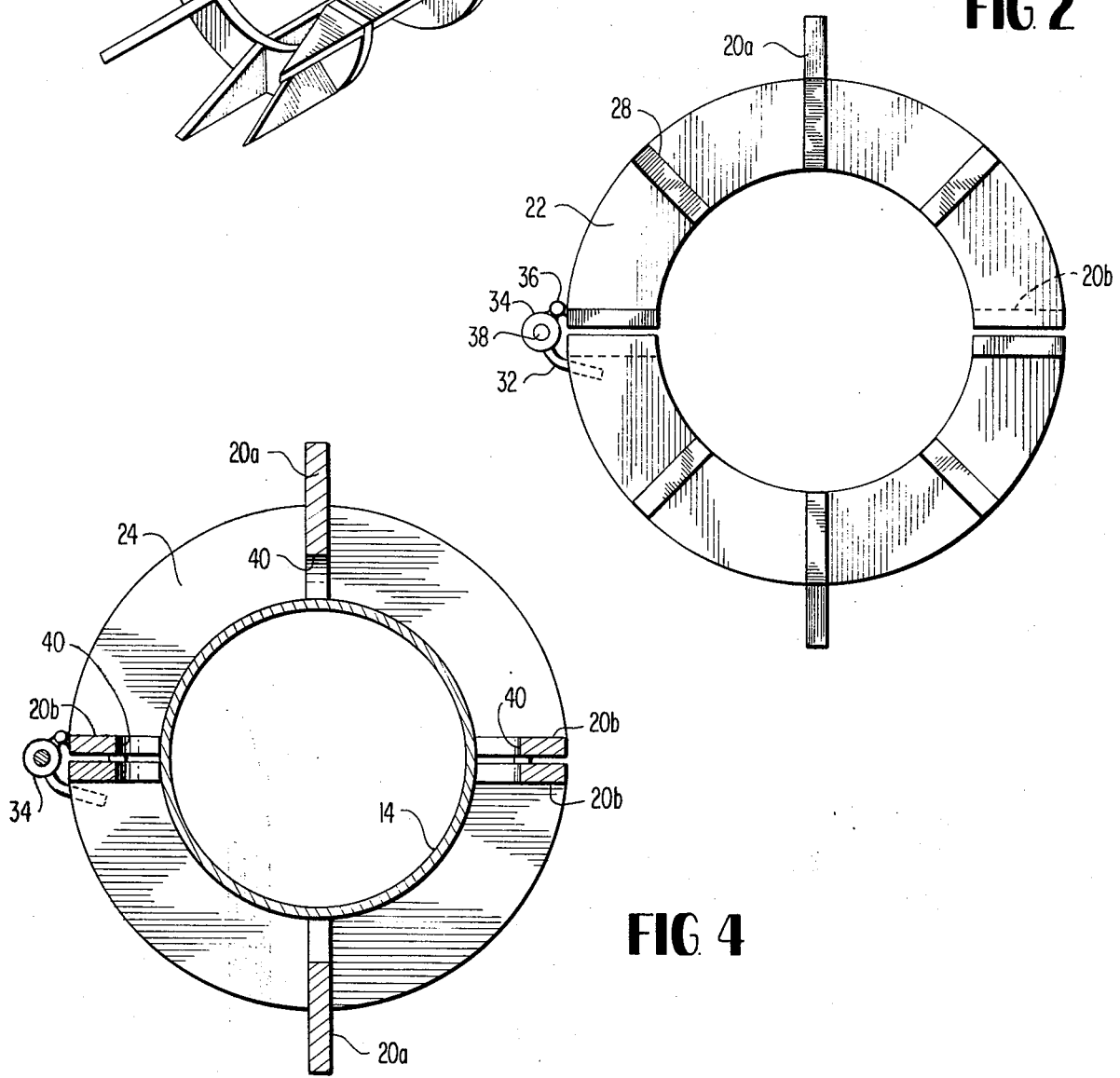
FIG. 2 is an enlarged end view thereof.
Figure 4:
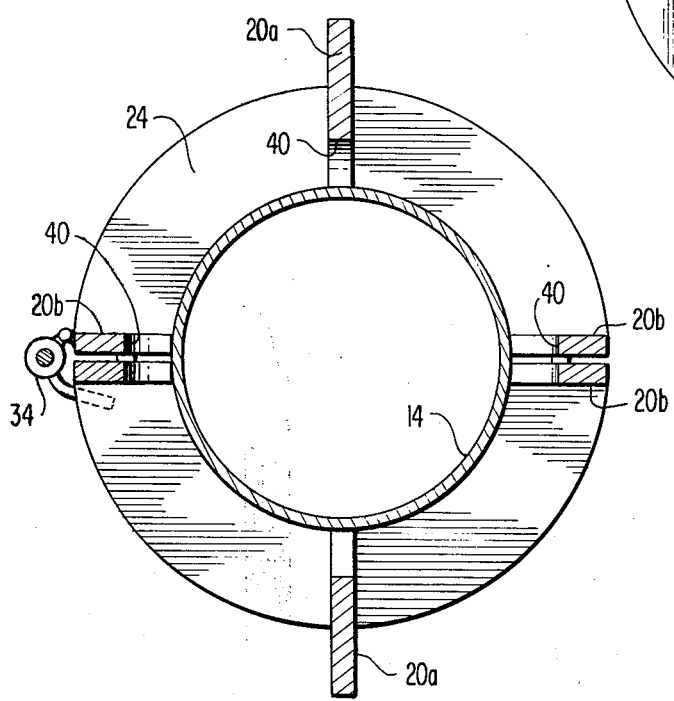
FIG. 4 is a cross-sectional view thereof taken generally about on line 4—4 in FIG. 3.

A plurality of circumferentially spaced guide elements 28 are carried by a like end of each of clamp sections 16 and 18. Preferably, these guide elements 28 comprise plates connected, for example, by welding, to the semi-annular stiffener plates 22 for projection in an axial direction. The inner edges 30 of the elements 28 taper radially outwardly and are thus adapted to guide the end of pipe sections within the cylindrical confines of the clamp when the sections 16 and 18 are closed about the pipe sections and form a generally cylindrical clamp as illustrated in FIGS. 2 and 4.

In a preferred form of the present invention, the clamp sections 16 and 18 are pivotally secured one to the other along a side edge thereof. Particularly, and referring to FIGS. 2 and 4, a plurality of shackles 32 having eyelets 34 are secured to one of the clamp sections, i.e., clamp section 18. A rod 36 having like eyelets is secured as by welding to the other clamp section, i.e., section 16. When eyelets are longitudinally aligned, a hinge rod or shaft 38 is passed through the eyelets and secured against longitudinal displacement. Thus, clamp sections 16 and 18 are pivoted about shaft 38.

Figure 5:
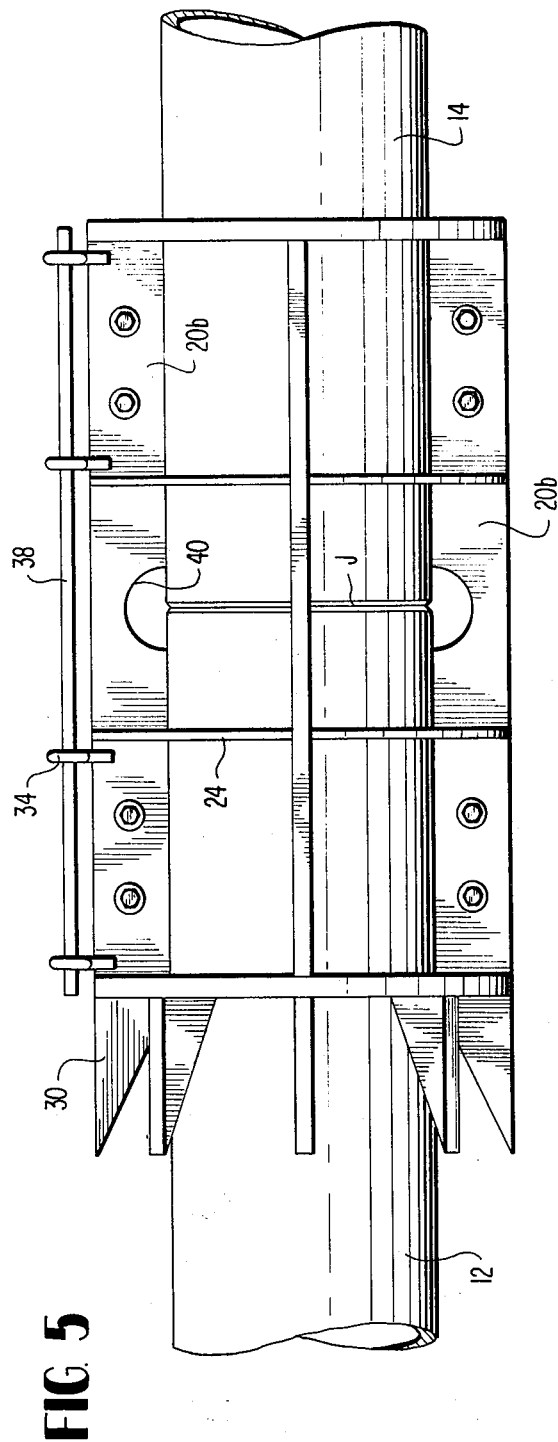
FIG. 5 is a view similar to FIG. 3 illustrating the clamp hereof rotated 90° from its position as illustrated in FIG. 3.

From a review of FIGS. 3 and 5, it will be observed that each of the guide bars 20a and 20b of each section 16 and 18 is provided with a central recess 40. That is to say, the inner edges of guide bars 20a and 20b are recessed medially of their ends at like axial positions of the clamp whereby the joint J between pipe sections 12 and 14 is readily accessible from any circumferential position about the pipe sections.

In use, clamp sections 16 and 18 are opened and receive one end of the pipe section, for example, pipe section 14. The clamp may then be substantially closed and maintained in that substantially closed position with the end of pipe section 14 at a like axial position as the recesses 40 along the inner edges of the guide bars 20a and 20b. The end of pipe section 12 may then be received in the opposite end of clamp 10 with the guides 28 serving to align section 12 with the generally cylindrical opening in clamp 10 upon initial insertion of the pipe section 12 into the clamp. Upon full insertion, the ends of the pipe sections 12 and 14 are butted one against the other and the bolts previously disposed through the registering openings 26 along opposite sides of the clamp may be fully tightened whereby the pipeline section ends are clamped one to the other in longitudinal alignment. It will be appreciated that the inner edges of the guide bars 20a and 20b bear on the pipeline sections 12 and 14 at circumferentially spaced positions thereabout. Note that the recesses 40 provide a gap or space whereby access to the juncture J between the pipeline sections 12 and 14 is provided at any circumferential location thereabout. Thus, welding tools and weldment may be readily utilized about the area of the joint with little or no interference from clamp 10.

It will be appreciated that the foregoing arrangement is particularly useful for welding riser pipe casings one to the other in an offshore drilling environment. For example, the pipe sections 12 and 14 may be vertically disposed with the clamp being first disposed about the upper end of pipe section 14. The lower end of pipe section 12 may then be disposed within the clamp and the clamp tightened as previously described to clamp the vertical riser sections 12 and 14 in axial alignment one with the other. After welding, the bolts can be removed whereby the riser sections can be jointly lowered and the clamp reused to facilitate welding of additional riser sections to the section just lowered.

An embodiment of the present invention particularly adapted for use with 20 inch outside diameter pipe provides a clamp having an overall length of about 6 feet. Preferably, one and ½ inch steel plating is utilized to form the guide bars and end stiffener members whereas ½ inch steel plating is utilized to form intermediate stiffeners 24. A 3 inch radius is provided for each of recesses 40 with the width of the guide bars being about 6 inches. It will be appreciated that guide elements 28 can be provided at the opposite end of the clamp as well whereby the clamp could be used to receive pipelines from either end.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A clamp for aligning butted pipe sections comprising:
   a pair of clamp sections each having an elongated, generally semi-cylindrical, open framework including a plurality of circumferentially spaced longitudinally extending guide bars connected one to the other by a plurality of circumferentially extending, generally semi-circular, longitudinally spaced stiffening elements, means for connecting said clamp sections one to the other about the end portions of a pair of pipe sections whereby said clamp sections form a generally cylindrical clamp concentrically disposed about the pipe sections, said longitudinally extending guide bars having a length greater than the diameter of the cylindrical clamps formed by said clamp sections, the inner edges of said guide bars defining longitudinally extending substantially continuous smooth surfaces engageable substantially throughout the entire length of said guide bars with the pipe sections for maintaining the same in axial alignment one with the other, each said clamp section having at least four of said stiffeners with a pair of said stiffeners being located on each of the opposite sides of the pipe section joint.

2. A clamp according to claim 1 wherein the inner edges of said guide bars are recessed at like axial positions about said clamp to radially space said edge portions from the pipe section joint to provide for access to the joint at each circumferential location thereabout.

3. A clamp for aligning butted pipe sections comprising:
a pair of clamp sections each having an elongated, generally semi-cylindrical, open framework including a plurality of circumferentially spaced longitudinally extending guide bars connected one to the other by a plurality of circumferentially extending, generally semi-circular, longitudinally spaced stiffening elements, means for connecting said clamp sections one to the other about the end portions of a pair of pipe sections whereby said clamp sections form a generally cylindrical clamp concentrically disposed about the pipe sections, the inner edges of said guide bars defining longitudinally extending surfaces engageable with the pipe sections for maintaining the same in axial alignment one with the other, and guide elements carried by said clamp sections, the inner edges of said guide bars defining longitudinally extending surfaces engageable with the pipe sections for maintaining the same in axial alignment one with the other, and guide elements carried by said clamp sections at one like end thereof for guiding a pipe section into the clamp sections.

4. A clamp according to claim 1 wherein said connecting means includes a hinge interconnecting said clamp sections along one longitudinally extending side thereof to permit said clamp sections to pivot relative to one another about a longitudinally extending axis, and means for releasably clamping the opposite sides of said clamp sections one to the other.

5. A clamp according to claim 3 wherein the inner edges of said guide bars are recessed at like axial positions about said clamp to radially space said edge portions from the pipe section joint to provide for access to the joint at each circumferential location thereabout.

6. A clamp according to claim 1 wherein the inner edges of said guide bars are recessed at like axial positions about said clamp to radially space said edge portions from the pipe section joint to provide for access to the joint at each circumferential location thereabout, said connecting means including a hinge interconnecting said clamp sections along one longitudinally extending side thereof to permit said clamp sections to pivot relative to one another about a longitudinally extending axis, and means for releasably clamping the opposite sides of said clamp sections one to the other.

7. A clamp according to claim 3 wherein, said connecting means including a hinge interconnecting said clamp sections along one longitudinally extending side thereof to permit said clamp sections to pivot relative to one another about a longitudinally extending axis, and means for releasably clamping the opposite sides of said clamp sections one to the other.

8. A clamp according to claim 1 wherein each clamp section has a guide bar extending longitudinally along opposite sides thereof, the guide bars along opposite sides of one clamp section lying in registry with the corresponding guide bars of the other clamp section.

9. A clamp according to claim 8 wherein said connecting means includes a hinge interconnecting said clamp sections along one side thereof for permitting the sections to pivot relative to one another about a longitudinally extending axis, and means for releasably clamping the opposite sides of said clamp sections one to the other.

10. A clamp according to claim 9 wherein said releasable clamping means includes a plurality of openings in the registering side guide bars and a plurality of bolts receivable through said openings to secure said clamp sections one to the other.

11. A clamp for aligning butted pipe sections comprising:
a pair of clamp sections each having an elongated, generally semi-cylindrical, open framework including a plurality of circumferentially spaced longitudinally extending guide bars connected one to the other by a plurality of circumferentially extending, generally semi-circular, longitudinally spaced stiffening elements, means for connecting said clamp sections one to the other about the end portions of a pair of pipe sections whereby said clamp sections form a generally cylindrical clamp concentrically disposed about the pipe sections, the inner edges of said guide bars defining longitudinally extending surfaces engageable with the pipe sections for maintaining the same in axial alignment one with the other, each clamp section having a guide bar extending longitudinally along opposite sides thereof, the guide bars along opposite sides of one clamp section lying in registry with the corresponding guide bars of the other clamp section, said connecting means including a hinge interconnecting said clamp sections along one side thereof for permitting the sections to pivot relative to one another about a longitudinally extending axis, and means for releasably clamping the opposite sides of said clamp sections one to the other, the inner edges of said guide bars being recessed at like axial positions about said clamp to radially space said edge portions from the pipe section joint to provide for access to the joint at each circumferential location thereabout, and guide elements carried by said clamp sections at one like end thereof for guiding the pipe sections into the clamp sections.

12. A clamp according to claim 1 including guide elements carried by said clamp sections at one like end thereof for guiding a pipe section into the clamp sections.

13. A clamp according to claim 1 wherein the inner edges of said guide bars are recessed at like axial positions about said clamp to radially space said edge portions from the pipe section joint to provide for access to the joint at each circumferential location thereabout, guide elements carried by said clamp sections at one like end thereof for guiding a pipe section into the clamp sections.

14. A clamp according to claim 1 including guide elements carried by said clamp sections at one like end thereof for guiding the pipe sections into the clamp sections, said connecting means including a hinge interconnecting said clamp sections along one longitudinally extending side thereof to permit said clamp sections to pivot relative to one another about a longitudinally extending axis, and means for releasably clamping the opposite sides of said clamp sections one to the other.

15. A clamp according to claim 9 wherein the inner edges of said guide bars are recessed at like axial positions about said clamp to radially space said edge portions from the pipe section joint to provide for access to the joint at each circumferential location thereabout, and guide elements carried by said clamp sections at one like end thereof for guiding the pipe sections into the clamp section.

* * * * *